United States Patent [19]
Crabb

[11] Patent Number: 6,003,614
[45] Date of Patent: Dec. 21, 1999

[54] HITCH ASSEMBLY PROVIDING ARTICULATION AND OSCILLATION

[75] Inventor: Elmer R. Crabb, Granbury, Tex.

[73] Assignee: Caterpillar Inc., Peoria, Ill.

[21] Appl. No.: 08/909,751

[22] Filed: Aug. 12, 1997

[51] Int. Cl.$^6$ .................................................. A01B 59/043
[52] U.S. Cl. ...................................... 172/439; 280/416.2
[58] Field of Search ..................... 172/439, 248, 172/450, 440, 441, 442, 444, 445, 677, 679, 680; 280/494, 493, 416.2, 416.1, 415.1; 56/DIG. 14

[56] References Cited

U.S. PATENT DOCUMENTS

| | | | |
|---|---|---|---|
| 1,557,841 | 10/1925 | Holmes | 280/494 |
| 2,321,516 | 6/1943 | Robertson | 280/416.2 X |
| 2,583,191 | 1/1952 | Vorhees | 280/494 |
| 3,618,671 | 11/1971 | Chantland | 172/297 |
| 3,905,619 | 9/1975 | Sylvester | 280/416.2 |
| 4,200,306 | 4/1980 | Helms | 280/494 |
| 4,272,098 | 6/1981 | Greatbatch | 280/494 |
| 4,711,461 | 12/1987 | Fromberg | 280/494 |
| 5,186,483 | 2/1993 | Sheppard | 280/494 |
| 5,531,283 | 7/1996 | Austin et al. | 280/494 X |
| 5,601,146 | 2/1997 | Schlegel et al. | 172/439 |
| 5,709,274 | 1/1998 | Herbold | 172/439 X |

FOREIGN PATENT DOCUMENTS

| | | |
|---|---|---|
| 1123220 | 9/1956 | France . |
| 1373981 | 1/1965 | France . |
| 2532146 | 3/1984 | France . |
| 1128958 | 10/1968 | United Kingdom . |

*Primary Examiner*—Victor Batson
*Attorney, Agent, or Firm*—O. Gordon Pence; Steven G. Kibby

[57] ABSTRACT

A hitch assembly for a tractor is disclosed, which includes a rotatable carriage support that is carried on a fixed trunnion for providing oscillation of the hitch frame about horizontal first axis. The rotatably carriage support also pivotally mounts a hitch carriage about a second axis to provide the hitch assembly with the ability to articulate as well. Camming apparatus is also provided to progressively restrict the oscillation of the hitch frame as it is being raised and stop surfaces restrict articulation when the hitch frame is in its raised position. The articulation and oscillation ability of the hitch provides improved ease of steering and control of the tractor and improved ground contact of a ground-contacting implement on the hitch frame. A power-take-off shaft extends through said center of the fixed trunnion supporting the hitch mounting to permit simultaneous connection of the implement with the hitch and the power-take-off shaft for transmitting rotary power to the implement.

20 Claims, 4 Drawing Sheets

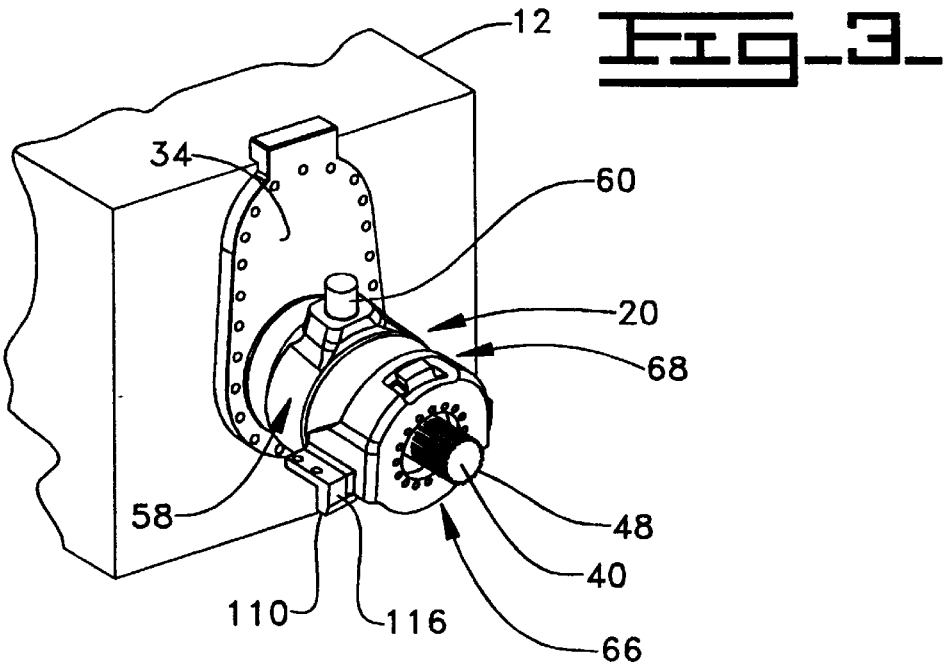
Fig_3_
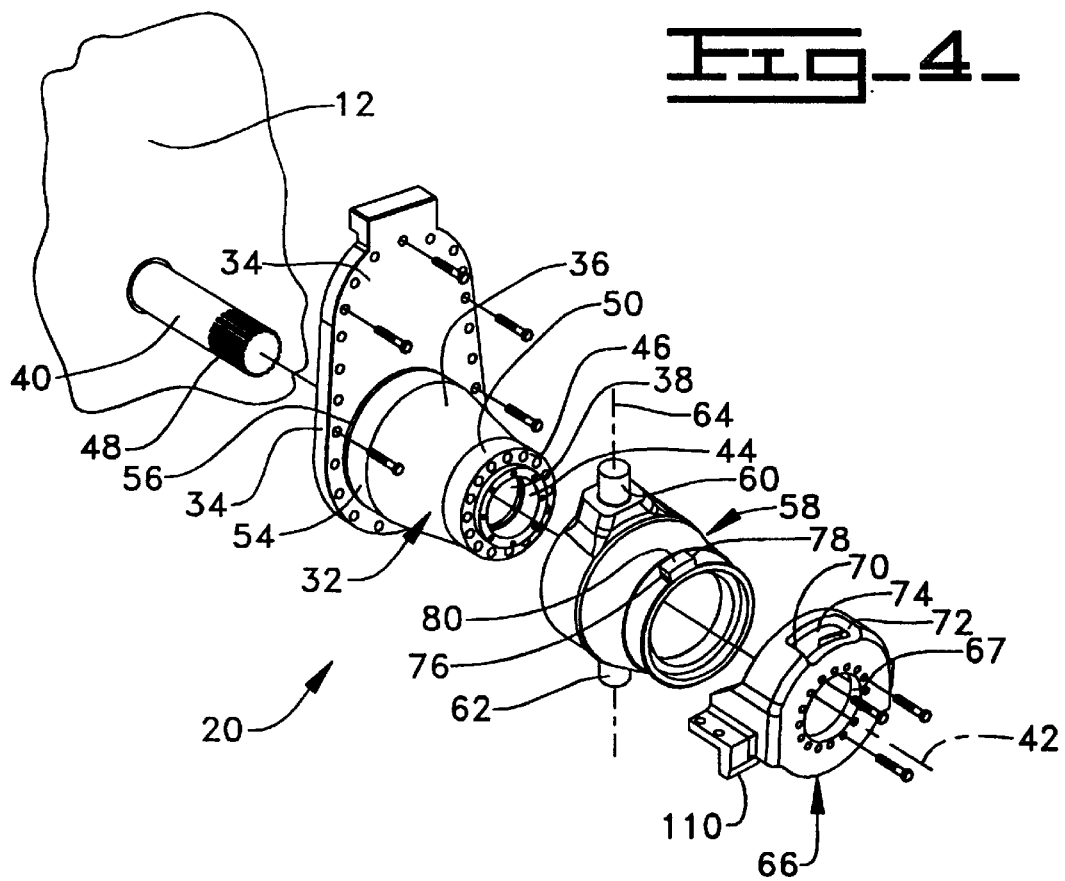
Fig_4_

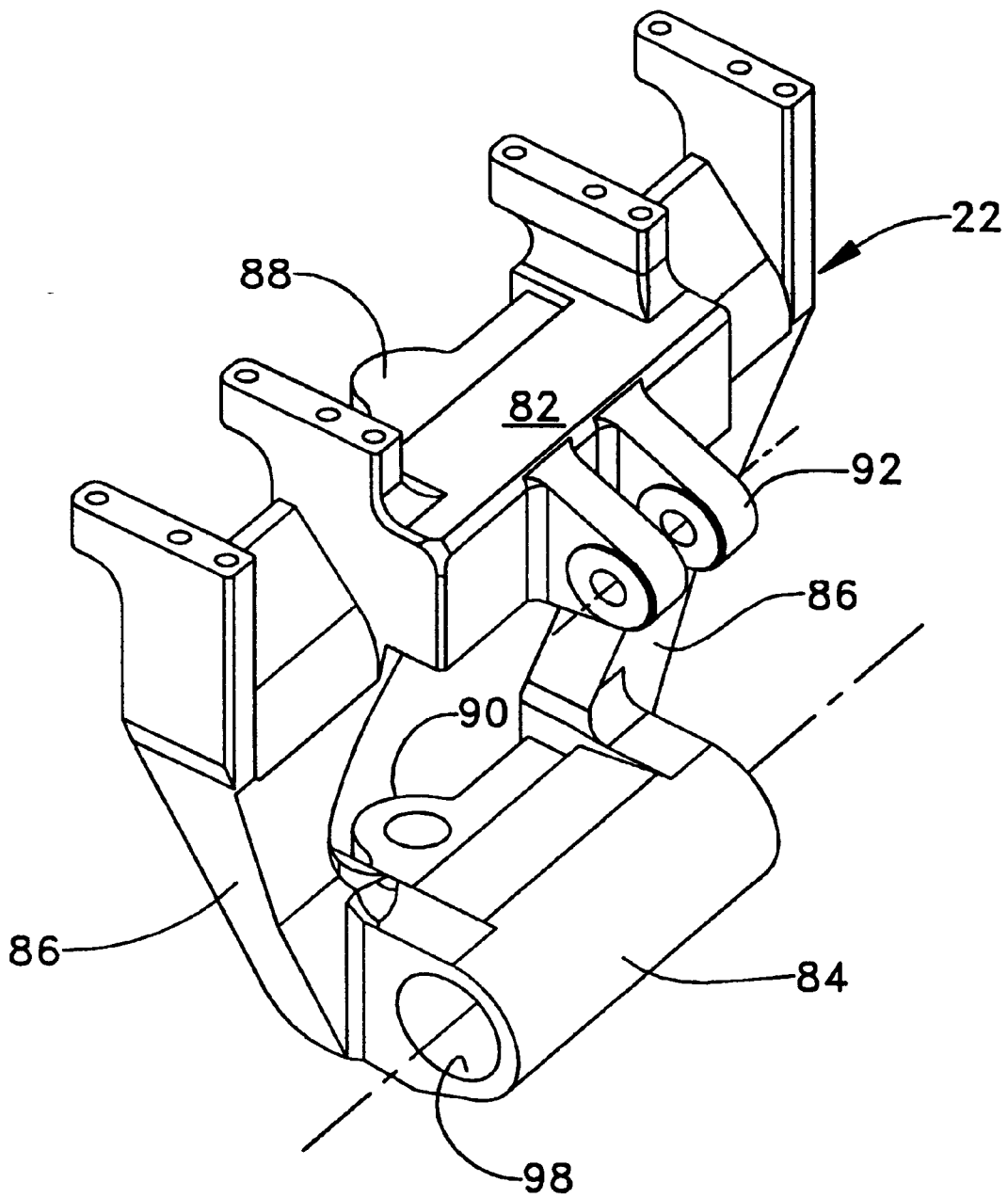
Fig_5_

HITCH ASSEMBLY PROVIDING ARTICULATION AND OSCILLATION

DESCRIPTION

1. Technical Field

This invention generally pertains to a hitch for attaching tools to work machines, and more particularly to 3-point hitch which will provide articulation and oscillation of an attached tool to a work machine such as an agricultural tractor.

2. Background Art

As work machines have become more widespread and more commonly employed over the years as traction engines or tractors, it has become necessary to attach various tools or implements to the work machines in order to perform the various functions required thereof. One typical means of attaching implements to tractors has been the one-point connection to the drawbar of the tractor. Another method of attaching tools to a tractor is that of attaching a tool directly and immovably to one or more frame elements of the tractor. The first method of connecting tools to a tractor is suitable for applications in which a tool is simply to be drawn by the tractor. In such cases, it is common to control the functions of the tool or implement by the use of remote hydraulic cylinders mounted upon the tool or implement. On the other hand, the frame-mounted tool becomes integral with the tractor, providing a greater controllability of the tool or implement. This provides a higher level of functionality for certain operations. For example, in the agricultural art, it is typically desirable to employ integrally mounted front-end loaders and blades on tractors to assure that the tool is suitably controllable, and also to provide maximum maneuverability of the tool and tractor combination.

While both of the afore-mentioned methods of attaching tools are suitable for many applications, it has also been found desirable to provide a means of selectably attaching and detaching implements which requires little or no modification of the tractor, and also requires of the operator the minimum time and effort for exchanging tools or implements to enable the tractor to perform different functions. While various hitches have been employed over the years, a hitch known as the three-point hitch has come to be the standard hitch for the attachment of integral and semi-integral tools, implements, and equipment to tractors, particularly agricultural tractors.

The typical three-point hitch employs two lower link arms and a third hitch link which is disposed above and centrally between the lower links of the hitch. Typically, all three of the links of the three-point hitch are transversely pivotally mounted to permit a generally parallel vertical lift action of the three-point hitch. Lift means, commonly in the form of a hydraulic cylinders attached to each of the lower links, are provided for controlling the vertical motion of an implement or tool attached to the three-point hitch. It is also not uncommon to find such three-point hitches equipped with mounts which pivot to permit some degree of articulation of the implement with respect to the tractor. However, such articulation action is usually restricted to a matter of five to ten degrees at the very most, and in fact is usually limited to a much lower degree in order to maximize the integral nature of the tractor and the tool. Typically, it has been considered undesirable to permit articulation in any substantial degree between the tractor and the tool. One reason for this consideration has been that on the typical tire-tractor, the constraint of the implement when in a ground-engaging condition, may cause some skidding of the tires if a turn is attempted, but will not cause an undue stress or drain on the tractor or the implement. Another consideration has typically been that many of the functions in which the three-point hitch is employed on smaller tire-type tractors have required that the implement have the greatest amount of control and is to be controlled positionally by the tractor at all times, for example, when employing a mower or other similar device.

It must be noted that an additional and very important advantage of the three-point hitch has been the ability to employ the rotary power take-off shaft typically found on many tractors to power implements while mounted on the standard three-point hitch.

While the three-point hitch as described above has been found to be acceptable in the past, it has been discovered to be less suitable in its application to articulated tractors and to track-type tractors. A major cause of this unsuitability is the fact that both articulated and track-type tractors tend to require an increased amount of horizontal articulation during their steering operations. Where on a typical front-end steered tire-type tractor, the articulation is relatively low during the steering operation due to the typically relatively large turning radius, the turning radius of a track-type tractor can be zero. Also, the steering action of the both articulated and track-type tractors occur in the center of the tractor, which causes an instant, substantial change in horizontal articulation at the hitch. Such a substantial change in the articulation position of the tractor and implement causes a large instantaneous stress upon the tool when in a ground-engaging position, and this stress is transmitted through the hitch to the tractor. It has been found that the typical three-point hitch according to the prior art cannot be satisfactorily applied to these tractors in a manner which will minimize this stress transferal.

Furthermore, as the relative size of implements has increased, it is desirable to provide the tool with the ability to oscillate or roll about an axis which is parallel to the typical direction of travel of the tractor when the tool is in a ground-engaging position. This is due primarily to the fact that the contours of the ground on which tools are operated often makes it necessary for the tool to operate momentarily on a different gradient or plane than the tractor itself is traversing.

Therefore, it is an object of the present invention to provide a hitch for securing a tool integrally to a tractor as will permit suitable articulation of the tool with respect to the tractor.

It is another object of the present invention to provide such a hitch as will permit a horizontal oscillation of the tool with respect to the tractor.

It is another object of the present invention to provide such a hitch that will provide control of the articulation and oscillation when the hitch is raised.

It is yet another object of the present invention to provide such a hitch that will permit the use of the rotary power take-off shaft without modification of the hitch or of the tractor.

SUMMARY OF THE INVENTION

In one aspect of the present invention, a pivotable hitch mounting is provided for pivotably mounting a hitch assembly to a tractor. A fixed trunnion is secured to the tractor and a rotatable carriage support is carried upon the fixed trunnion for oscillation about a first axis. The rotatable carriage support has a pair of opposing trunnions extending along a second axis and a hitch carriage is pivotally carried upon the opposing trunnions of the rotatable carriage support for oscillation about the second axis, whereby the hitch carriage is free to oscillate about the first axis and to articulate about the second axis.

In another aspect of the present invention, a hitch assembly is provided for a tractor, which includes a pivotable hitch mounting having a rotatable carriage support pivotable about a first axis and having a pair of opposing trunnions extending along a second axis. A hitch carriage is carried upon the opposing trunnions of the rotatable carriage support for oscillation about the second axis, whereby the hitch carriage is free to oscillate about the first axis and to articulate about the second axis. A pair of lower draft links each have a proximal end pivotally connected to the hitch carriage for pivotal movement about a third axis. Aa center upper link has a proximal end pivotally connected to the hitch carriage above and between the draft links. Aa pair of actuators are supported on the hitch carriage and each have a distal end pivotally connected to a respective one of the draft links for selectively raising the draft links to a raised position and lowering them to a lowered position relative to the hitch carriage.

BRIEF DESCRIPTION OF THE DRAWINGS

FIG. 3 shows an assembled perspective view of the fixed trunnion, rotatable carriage support and end cover of the pivotable hitch mounting for the hitch assembly according to the present invention, as shown in FIG. 2.

FIG. 4 shows an exploded perspective view of the components depicted in FIG. 3 of the hitch apparatus according to the present invention.

FIG. 5 shows a perspective view of the hitch carriage of the hitch assembly.

DESCRIPTION OF THE PREFERRED EMBODIMENT

Figure 1:
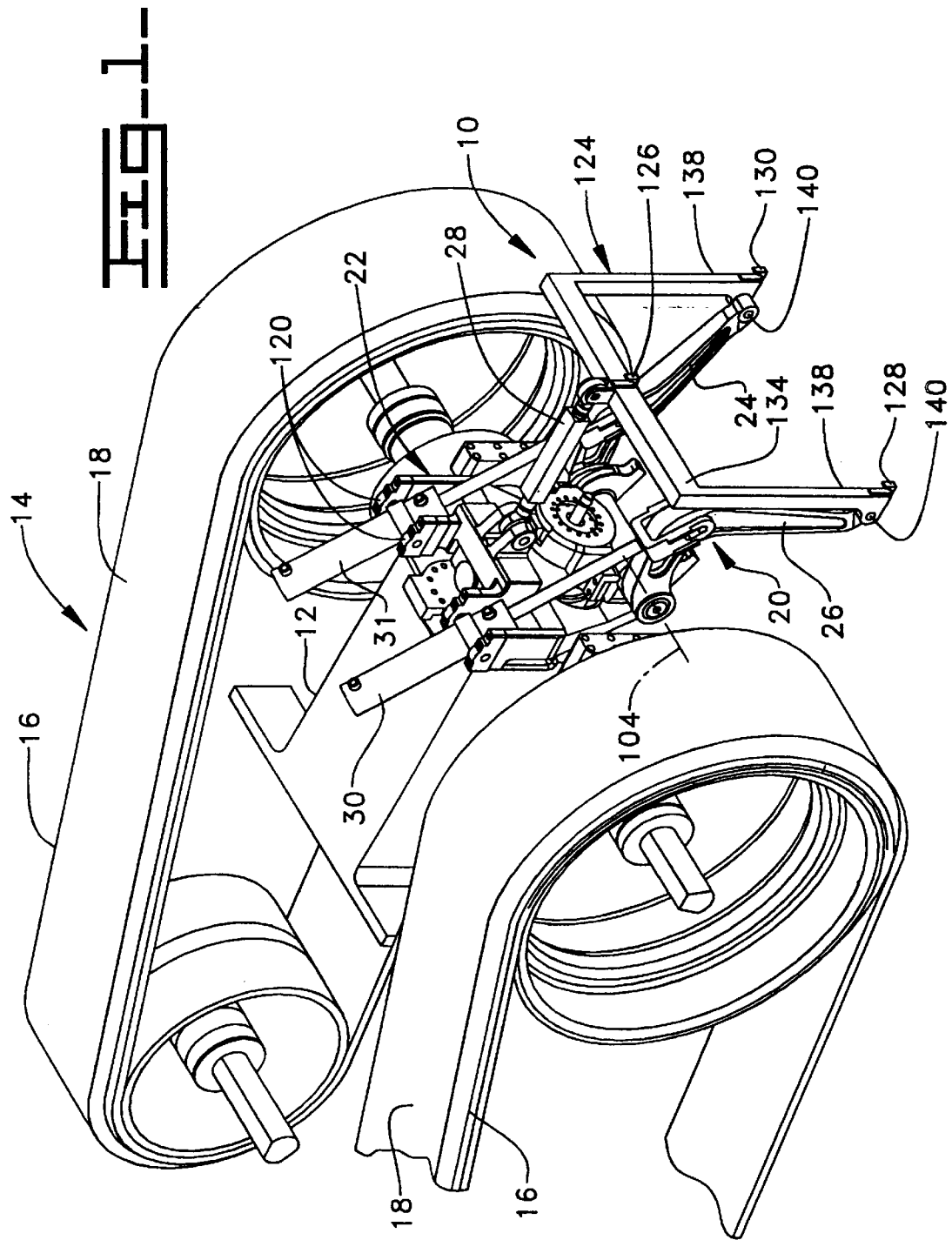
FIG. 1 shows a partial perspective view of the tractor with a hitch assembly constructed in accordance with the present invention.

Referring more particularly to the drawings, a hitch assembly embodying the principles of the present invention is depicted at 10 in FIG. 1 and is shown mounted to the rear of a frame 12 of an agricultural tractor 14. Such tractor 14 includes a number of components and systems which do not comprise part of the subject invention and are well known to those skilled in the art. Thus, the particular features of such components, which may be varied to suit the requirements of a given tractor 14, are not shown or described in further detail as it is believed that those skilled in the art are well able to understand and adapt these to any selected tractor within the realm of the present state of the art.

The particular tractor 14 shown in FIG. 1 includes two track assemblies 16 of a well known construction, which are attached on the left and right sides of the tractor frame 12 along the direction of travel of the tractor 14 for supporting and propelling the tractor. Each track assembly preferably includes a ground-engaging endless elastomeric drive or track belt 18 for propelling the tractor 14.

Figure 2:
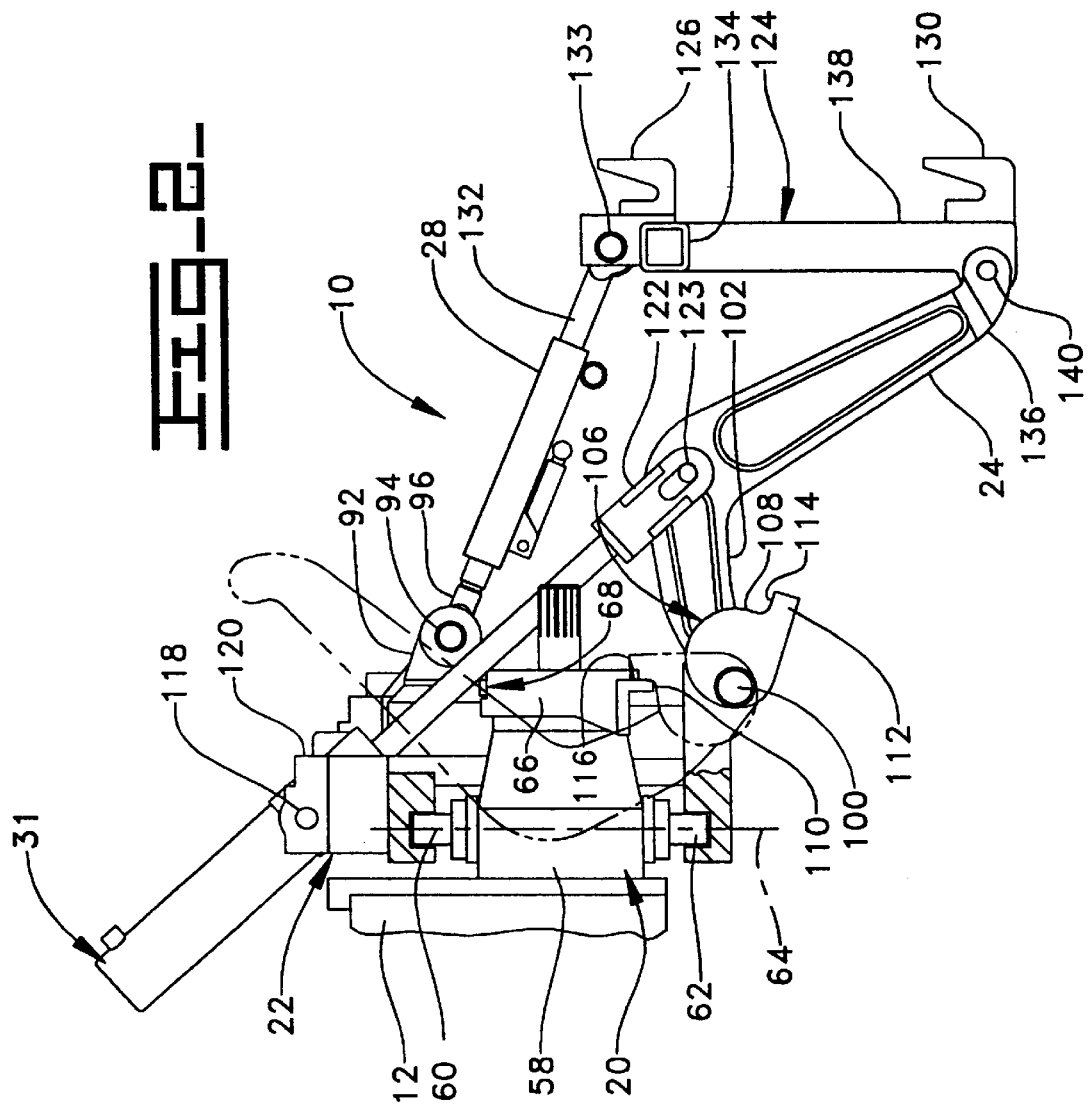
FIG. 2 shows a side view of the hitch apparatus, depicted in FIG. 1, but with portions thereof broken away and shown in section.

As best shown in FIGS. 2–4, hitch assembly 10 includes, in general, a pivotable hitch mounting 20, a hitch carriage 22, a pair of lower draft links 24,26, a center upper link 28 and a pair of actuators or hydraulic cylinders 30,31.

The pivotable hitch mounting 20 has a fixed trunnion 32 (FIG. 4) secured to the tractor 14. In particular, trunnion 32 has a forward mounting flange 34 that is secured by bolts or other suitable fasteners to the rear end of the tractor frame 12. Trunnion 32 also has a tubular body (36) having through opening 38. A power take-off (PTO) shaft 40 of the tractor, such as is known to those skilled in the art for transmitting rotary power from the prime mover of a tractor, extends from the rear of the tractor frame 12 through the mounting flange 34 and the coaxial opening 38 of the trunnion 32 along a first axis 42 that is generally parallel with the normal direction of travel of the tractor 14. A power take-off shaft support bearing 44 is provided in the distal end 46 of the trunnion 32 for providing rotational support to the shaft 40. The power-take-off shaft 40 includes a splined distal end 48 for selectively engaging an implement (not shown). Tubular body 36 may be cylindrical, but preferably is of a frusto-conical form generated about the first axis 42. The body 36 includes an annular first support bearing surface 50 adjacent the body distal end 46, and an annular second support bearing surface 54 adjacent the body proximate end 56.

The pivotable hitch mounting 20 also includes a rotatable carriage support 58, which is carried upon the fixed trunnion 32 for oscillation about the first axis 42. The rotatable carriage support 58 has a pair of opposing trunnions 60,62 extending along a second axis 64, which is preferably perpendicular to the first axis 42. An end cover 66 is secured by bolts or other suitable fasteners to the distal end 46 of the fixed trunnion 32 for retaining the rotatable carriage support 58 on the fixed trunnion. End cover 66 has a coaxial opening 67 for receiving the power take-off shaft 40 therethrough.

Apparatus 68 is provided for limiting oscillation of the rotatable carriage support 58 about the first axis 42. Such oscillation limiting apparatus 68 preferably includes a pair of fixed radial surfaces 70,72 provided at the ends of a circumferentially extending slot 74 through the end cover 66 and a pair of opposing radial surfaces 76,78 on a radially extending tang 80 on the rotatable carriage support 58. One of the pair of fixed radial surfaces 70 is disposed in a predetermined spaced circumferential relationship to a respective one of the pair of opposing radial surfaces 76 to limit rotation of the rotatable carriage support in one direction, while the other of the fixed surfaces 72 is disposed in a predetermined spaced circumferential relationship to other of the opposing surfaces 78 to limit rotation of the rotatable trunnion in the opposite direction. Preferably, the hitch carriage may freely oscillate about the first axis 42 within a range of from 10 to 12 degrees clockwise or counterclockwise.

As best seen in FIG. 5, the hitch carriage 22 includes an upper cross member 82, a lower cross member 84 and a pair of side members 86. An upper pivot 88 is carried on the upper cross member while a lower pivot 90 is carried on the lower cross member 84 for pivotally mounting the carriage upon the opposing trunnions 60,62, respectively, of the rotatable carriage support 58. Thus, the carriage 22 is free to oscillate about the first axis 42 and to articulate about the second axis 64. A rearwardly extending pin clevis 92 is also provided on the upper cross member 82 for receiving a pin 94 to pivotally mount a proximal end 96 of the center link 28 to the carriage 22 at a position above and between the draft links 24,26. The lower cross member 84 has a pin bore 98 for rotatably receiving an elongated pivot pin 100 therethrough (FIG. 2). A proximal end 102 of each of the draft links 24,26 are secured to one of the respective opposite ends of pin 100 to permit pivotal movement of the draft links 24,26 about a third axis 104 between a lowered position (depicted in solid lines in FIG. 2) and a raised position (depicted in dashed lines). The third axis 104 is preferably perpendicular to the first and second axes 42,64.

Camming apparatus 106 are provided for progressively limiting the oscillation of the hitch carriage 22 about the first axis 42 as the drafts links 24,26 move from their lowered positions to their raised positions. Such camming apparatus preferably includes a camming lobe 108 carried on each of the draft links 24,26 and a pair of cam followers 110 on opposite sides of the end cover 66. Each of the cam followers 110 are disposed to engage a respective one of the camming lobes 108 so as to cooperatively level the hitch carriage 22 as the draft links 24,26 move from their lowered positions to their raised positions and restrict the oscillation of the hitch carriage 22 about the first axis 42 when the draft links are in their raised positions. Thus, the hitch carriage 22 is free to oscillate about the first axis 42 to the maximum extend permitted by the oscillation limiting apparatus 68 when the drafts links 24,26 are in their lowered position, but the hitch carriage 22 is restricted from oscillation when the draft links 24,26 are in their raised positions.

Articulation stop apparatus 112 are also provided for restricting the articulation of the hitch carriage 22 about the second axis 64 when the draft links 24,26 are moved to their raised positions. Such articulation stop apparatus 112 preferably includes a first pair of stop surfaces 114 and a second pair of abutting stop surfaces 116. One of the first pair of stop surfaces 114 is carried on a respective one of the draft links 24,26 and each of the second pair of abutting stop surfaces 116 are carried on the end cover 66 and are positioned to engage a respective one of the first pair of stop surfaces 114 when the draft links 24,26 are in their raised positions so as to restrict articulation of the hitch carriage 22 about the second axis 64.

Each of the pair of actuators 30,31 are supported on the hitch carriage 22 by trunnion pins 118 carried on each actuator 30,31 and each of which are pivotally mounted by a respective one of pair of laterally spaced apart pivots 120 carried along the upper cross member 82 of the carriage 22. Each of the actuators 30,31 has a distal end 122, which is pivotally connected to a respective one of the draft links 24,26 by pins 123. Such actuators 30,31 may be utilized for selectively raising the draft links 24,26 to their raised position and for lowering them to a lowered position relative to the hitch carriage.

A hitch frame 124 of generally inverted U-shaped configuration has a central upper hook 126 and a pair of laterally spaced lower hooks 128,130 for attaching an implement (not shown) to the hitch assembly 10. The center upper link 28 has a distal end 132 which is pivotally connected by a pin 133 to an upper cross member 134 of the hitch frame 124. Each of the pair of draft links 24,26 have a distal end 136 which is pivotally connected to a respective one of a pair of downwardly extending legs 138 of the hitch frame 124 by pins 140.

Industrial Applicability

In typical operation, a 3-point hitch adapted ground-engaging implement, not shown, but as is well known in the art, is attached to the lower hitch pin hooks 128,130 and the upper hitch pin hook 126 of the hitch frame 124. The extensible actuators 30,31 are extended to increase the length thereof, thereby lowering the lower draft links 24,26, or retracted to decrease the length thereof, thereby raising the draft links 24,26 with respect to the hitch carriage 22, thus lowering and raising the hitch frame 124 and the attached implement with respect to the tractor 14. The center link 28 restrains the hitch frame 124 to be substantially parallel to the hitch carriage 22. However, center link 28 is constructed to be adjustable so that its length may be varied. Thus, the attitude of the hitch frame can be adjusted to suit various implements.

The hitch frame 124 and hitch carriage 22, together with the attached implement, oscillate with respect to the tractor frame 12 by pivoting about the horizontal first axis 42 provided by the rotatable mounting of the rotatable carriage support 58 on the fixed trunnion 32. The hitch frame 124 and hitch carriage 22, together with the attached implement, can also simultaneously articulate horizontally with respect to the tractor frame 12 by the pivoting the hitch carriage 22 about the rotatable carriage support 58 about the generally vertical second axis 64 afforded by the pivotable connection between the trunnions 60,62 and the pivots 88,90, respectively.

Tractive effort generated by the tractor 14 is transmitted to the implement from the tractor frame 12 to the fixed trunnion 32 secured thereto, and then through the end cover 66 into the rotatable carriage support 58. This tractive effort is then transmitted to the hitch carriage 22 by way of the trunnions 60,62 and pivots 88,90. From the hitch carriage 22, the tractive effort is transmitted through the lower draft links 24,26 and center link 28 into the hitch frame 124 for action upon the implement. This permits the implement and the hitch frame 124 to freely and simultaneously oscillate and articulate when the hitch frame 124 is in its lowered position for ground engaging operation of the implement. When the hitch lift actuators 30,31 are actuated to lift the hitch frame 124 and the implement, both oscillation and articulation is restricted to prevent undesired, uncontrolled relative movement of the hitch frame 124 and implement. This is effectively accomplished by the camming apparatus 106, which progressively restricts oscillation of the hitch frame 124 as it is being raised from its lowered position to its raised position, and by the first and second stop surfaces, which restrict articulation about the second axis 64 when the hitch frame 124 is raised.

The power take-off shaft 40 extends through the center of the fixed trunnion in a coaxial fashion with the first axis 42. Such power take-off shaft 40 may be coupled to a power input of the implement, which is so equipped, for providing the transmission of rotary power to the implement as desired.

It can be readily seen that the hitch assembly 10 according to the subject invention provides several advantages over the prior art. In addition to providing a means of pivoting the hitch assembly 10 about a vertical axis, the present invention allows the hitch assembly 10 to oscillate about a horizontal axis as well. However, such articulation and oscillation is restricted when the hitch and implement are raised to afford the necessary control of the implement when it is raised. Therefore, it can be seen that the present invention presents substantial improvements over the prior art.

Modifications to the preferred embodiment of the subject invention will be apparent to those skilled in the art within the scope of the claims that follow:

What is claimed is:

1. A pivotable hitch mounting for pivotably mounting a hitch assembly to a tractor frame, comprising:
    a fixed trunnion having a tubular body capable of being secured to said tractor frame;
    a rotatable carriage support carried upon said fixed trunnion for oscillation about a first axis, said rotatable carriage support having a pair of opposing trunnions extending along a second axis;

a hitch carriage pivotally carried upon said opposing trunnions of said rotatable carriage support for articulation about said second axis, whereby said hitch carriage is free to oscillate about said first axis and to articulate about said second axis; and a pair of lower draft links, each of said draft links having a proximal end pivotally connected to said hitch carriage for pivotal movement about a third axis between a lowered position and a raised position.

2. The hitch mounting of claim 1 further comprising an end cover secured to a distal end of said fixed trunnion for retaining said rotatable carriage support on said fixed trunnion and an apparatus for limiting oscillation of said rotatable carriage support about said first axis, said oscillation limiting apparatus including a pair of fixed radial surfaces on said end cover and a pair of opposing radial surfaces on said rotatable carriage support, one of said pair of fixed radial surfaces being disposed in a predetermined spaced circumferential relationship to a respective one of said pair of opposing radial surfaces to limit rotation of said rotatable carriage support in one direction, while the other of said fixed radial surfaces is disposed in a predetermined spaced circumferential relationship to the other of said pair of opposing radial surfaces to limit rotation of said rotatable carriage support in an opposite direction.

3. The hitch mounting of claim 2 wherein said hitch assembly includes at least one actuator supported on said hitch carriage for moving said draft links between a lowered position and a raised position.

4. The hitch mounting of claim 3 including a camming apparatus for progressively limiting the oscillation of said hitch carriage about said first axis as the draft links move from their lowered positions to their raised positions.

5. The hitch mounting of claim 4 wherein said camming apparatus includes a camming lobe carried on each of said draft links and a pair of cam followers on said end cover, each of said cam followers being disposed to engage a respective one of said camming lobes so as to cooperatively level said hitch carriage as the draft links are raised and to restrict the oscillation of the hitch carriage about said first axis when the draft links are in their raised positions.

6. The hitch mounting of claim 3 including articulation stop apparatus for restricting the articulation of said hitch carriage about said second axis when said draft links are moved to their raised positions.

7. The hitch mounting of claim 6 wherein said articulation stop apparatus includes a first pair of stop surfaces and a second pair of abutting stop surfaces, one of said first pair of stop surfaces being carried on a respective one of said draft links and each of said second pair of abutting stop surfaces being carried on said end cover and being positioned to engage a respective one of said first pair of stop surfaces when said draft links are in their raised positions so as to restrict articulation of said hitch carriage about said second axis.

8. The hitch mounting of claim 2 wherein said fixed trunnion and said end cover each have a coaxial opening for receiving a power take-off shaft therethrough.

9. The hitch mounting of claim 8 wherein said fixed trunnion includes a bearing disposed within said coaxial opening about said power take-off shaft for rotatably supporting said power take-off shaft.

10. The hitch mounting of claim 2 wherein said hitch assembly includes:

a center upper link having a proximal end pivotally connected to said hitch carriage above and between said draft links;

a pair of actuators supported on said hitch carriage and each having a distal end pivotally connected to a respective one of said draft links for selectively raising said draft links to a raised position and lowering them to a lowered position relative to said hitch carriage; and a hitch frame having a central upper hook and a pair of laterally spaced lower hooks for attaching an implement to said hitch assembly.

11. The hitch assembly of claim 10 wherein said center upper link has a distal end pivotally connected to said hitch frame, and wherein each of said pair of draft links have a distal end pivotally connected to said hitch frame.

12. A hitch assembly for a tractor, comprising:

a pivotable hitch mounting having a rotatable carriage support pivotable about a first axis and having a pair of opposing trunnions extending along a second axis;

a hitch carriage carried upon said opposing trunnions of said rotatable carriage support for articulation about said second axis, whereby said hitch carriage is free to oscillate about said first axis and to articulate about said second axis;

a pair of lower draft links, each of said draft links having a proximal end pivotally connected to said hitch carriage for pivotal movement about a third axis;

a center upper link having a proximal end pivotally connected to said hitch carriage above and between said draft links; and a pair of actuators supported on said hitch carriage and each having a distal end pivotally connected to a respective one of said draft links for selectively raising said draft links to a raised position and lowering said draft links to a lowered position relative to said hitch carriage.

13. The hitch assembly of claim 12 wherein said hitch assembly further comprises an apparatus for limiting oscillation about said first axis, said oscillation limiting apparatus including a pair of fixed radial surfaces and a pair of opposing radial surfaces, said opposing radial surfaces being disposed on said rotatable carriage support and one of said pair of fixed radial surfaces being disposed in a predetermined spaced circumferential relationship to a respective one of said pair of opposing radial surfaces to limit rotation of said rotatable carriage support in one direction, while the other of said pair of fixed radial surfaces is disposed in a predetermined spaced circumferential relationship to the other of said pair of opposing surfaces to limit rotation of said rotatable carriage support in an opposite direction, whereby said rotatable carriage support is free to oscillate a predetermined angular amount as determined by the predetermined circumferential relationship of said pairs of fixed and opposing radial surfaces.

14. The hitch assembly of claim 13 including a camming apparatus for progressively limiting the oscillation of said rotatable carriage support about said first axis with the raising of said draft links.

15. The hitch assembly of claim 14, wherein said camming apparatus includes a pair of camming lobes, one of said camming lobes being carried on a respective one of said drafts links and each being disposed about said third axis, and a pair of fixed cam followers disposed to engage a respective one of said camming lobes such that said hitch carriage is free to oscillate about said first axis to a maximum extent permitted by said oscillation limiting apparatus when said drafts links are in their lowered position, but said hitch carriage is restricted from oscillation when said draft links are in their raised position.

16. The hitch assembly of claim 14 including an articulation stop apparatus for restricting the articulation of said hitch carriage about said second axis when said draft links are moved to their raised positions.

17. The hitch assembly of claim 15, further comprising a fixed trunnion secured to said tractor and supporting said rotatable carriage support, and wherein said tractor has a power take-off shaft extending along said first axis and wherein said fixed trunnion has a coaxial opening for receiving said power take-off shaft therethrough.

18. The hitch assembly of claim 17 wherein said fixed trunnion includes a bearing disposed within said coaxial opening about said power take-off shaft for rotatably supporting said shaft.

19. The hitch assembly of claim 16 including a hitch frame having a central upper hook and a pair of laterally spaced lower hooks for attaching an implement to said hitch assembly.

20. The hitch assembly of claim 19 wherein said center upper link has a distal end pivotally connected to said hitch frame, and wherein each of said pair of draft links have a distal end pivotally connected to said hitch frame.

* * * * *